(12) United States Patent
Schadler et al.

(10) Patent No.: US 8,008,362 B2
(45) Date of Patent: Aug. 30, 2011

(54) NANOPOROUS POLYMER FOAMS OF POLYCONDENSATION REACTIVE RESINS

(75) Inventors: Volker Schadler, Maikammer (DE); Vijay Immanuel Raman, Chennai (IN); Cedric Du Fresne Von Hohenesche, Manheim (DE)

(73) Assignee: BASF SE, Ludwigshafen (DE)

( * ) Notice: Subject to any disclaimer, the term of this patent is extended or adjusted under 35 U.S.C. 154(b) by 554 days.

(21) Appl. No.: 12/096,727

(22) PCT Filed: Nov. 30, 2006

(86) PCT No.: PCT/EP2006/069132
§ 371 (c)(1),
(2), (4) Date: Jun. 9, 2008

(87) PCT Pub. No.: WO2007/065847
PCT Pub. Date: Jun. 14, 2007

(65) Prior Publication Data
US 2009/0005468 A1    Jan. 1, 2009

(30) Foreign Application Priority Data
Dec. 9, 2005  (DE) .................. 10 2005 059 303

(51) Int. Cl.
*C08J 9/00*   (2006.01)
*C08G 12/06*  (2006.01)

(52) U.S. Cl. .......... 521/99; 521/113; 521/131; 521/181; 521/189

(58) Field of Classification Search ............. 521/99, 521/113, 131, 181, 187
See application file for complete search history.

(56) References Cited

U.S. PATENT DOCUMENTS

| | | | |
|---|---|---|---|
| 4,666,948 A | 5/1987 | Woerner et al. | |
| 4,822,697 A * | 4/1989 | Haluska et al. | 428/698 |
| 5,086,085 A | 2/1992 | Pekala | |
| 5,128,382 A | 7/1992 | Elliott, Jr. et al. | |
| 6,143,360 A * | 11/2000 | Zhong | 427/244 |

FOREIGN PATENT DOCUMENTS

| | | |
|---|---|---|
| WO | WO-99/01502 | 1/1999 |
| WO | WO-00/24799 A1 | 5/2000 |
| WO | WO-2005/049708 | 6/2005 |

OTHER PUBLICATIONS

Rigacci A. et al. "Preparation of polyurethane-base aerogels and xerogels for thermal superinsulation", Journal of Non-Crystalline Solids, (2004) vol. 350, pp. 372-378.

* cited by examiner

*Primary Examiner* — Irina S Zemel
(74) *Attorney, Agent, or Firm* — Connolly Bove Lodge & Hutz LLP

(57) ABSTRACT

A nanoporous polymer foam having an average pore diameter in the range of from 10 nm to 1000 nm, obtainable by means of a process comprising the following stages:
a) providing a solution of a polycondensation reactive resin in an organic solvent,
b) mixing the solution with a curing catalyst for the polycondensation reactive resin and curing the reactive components to form a gel, and
c) removing the organic solvent,
and the use thereof for thermal insulation purposes.

18 Claims, No Drawings

NANOPOROUS POLYMER FOAMS OF POLYCONDENSATION REACTIVE RESINS

This application is a national phase of PCT/EP2006/069132, filed on Nov. 30, 2006, which claims priority to DE 102005059303.8 filed on Dec. 9, 2005, the entire contents of all are hereby incorporated by reference.

DESCRIPTION

The invention relates to a process for the production of a nanoporous polymer foam of a polycondensation reactive resin.

Nanoporous polymer foams having a pore size distinctly below 1 μm and an overall porosity of more than 90% are very outstanding thermal insulators due to theoretical considerations.

Sol-gel techniques are widely used for the production of such nanoporous polymer foams. WO 00/24799 describes insulated bodies which can be obtained by mixing organic polyisocyanates with isocyanate trimerization catalysts to form an intermediate polymeric gel, which is then dried. In the Journal of Non-Crystalline Solids 350 (2004), pages 372 to 378, A. Rigacci et al. describe a process for the production of aerogels and xerogels based on polyurethanes. These exhibit significantly lower thermal conductivity than standard polyurethane foams.

Microcellular foams based on epoxy resin or methacrylates are disclosed by U.S. Pat. No. 5,128,382. They can be obtained by polymerization in a solvent/non-solvent and subsequent drying under subcritical conditions.

For the production of hydrogels based on melamine resin, usually hydrophilic melamines are produced in an aqueous medium via cross-linking reactions. These hydrogels are subsequently dried under sub- or supercritical conditions to form aerogels or xerogels. The drying stage usually takes place following one or more replacements of the water by an organic solvent. In the case of the extraction with carbon dioxide, the organic solvent serves for setting the appropriate polarity. In the case of the subcritical drying, the solvent exchange serves to provide the appropriate surface tension and wetting properties. Usually more than one solvent exchange is required for this purpose.

WO 05/049708 relates to nanoporous polymer foams which are obtainable by curing microemulsions. The microemulsion contains an aqueous reactive resin phase, a suitable amphiphilic agent and an oily phase, wherein the reactive components are subjected to polycondensation. In the subsequent drying process, the gel bodies thus obtained are freed from the fluid components, for example by freeze-drying.

In the abovementioned processes for the production of nanoporous polymer foams, the drying stage takes place either under complex supercritical conditions or with shrinkage of the polymer foam due to the high capillary forces that occur.

It is an object of the present invention to overcome the above disadvantages and to provide a process for the production of nanoporous polymer foams, in which it is possible to dry the gel bodies under subcritical conditions and in which shrinkage of the gel body takes place only to a low degree.

Accordingly, a process has been found for the production of a nanoporous polymer foam, said process comprising the following stages a) to c):

a) providing a solution of a polycondensation reactive resin in an organic solvent,
b) mixing the solution with a curing catalyst for the polycondensation reactive resin and curing the reactive components with the formation of a gel, and
c) removing the organic solvent.

The term "polycondensation reactive resins" is to be understood as denoting those resins which are obtainable by a polycondensation reaction and can be caused to react by the addition of curing agents at room temperature or without curing agents at elevated temperatures. Examples of these are amino resins, for example, urea formaldehyde resins, benzoguanamine formaldehyde resins, melamine formaldehyde resins, and mixtures thereof. According to the invention, the polycondensation reactive resins used are soluble in an organic solvent. Preferably, hydrophobic resins are used, which are miscible with less than 10% by weight, preferably with less than 5% by weight and more preferably with less than 0.01% by weight, of water.

Etherified polycondensation reactive resins, which are cured in stage b) with the elimination of an alcohol, are particularly preferred. Due to the alcohol elimination, the solution behavior is influenced during the gel formation. A butanol-etherified, highly alkylated melamine formaldehyde resin, which is non-dilutable by water and methanol, is particularly preferred.

In the preferred melamine formaldehyde resins, the melamine to formaldehyde ratio ranges from 1:1 to 1:10 and preferably from 1:2 to 1:6.

Suitable organic solvents for the polycondensation reactive resin are apolar compounds such as hydrocarbons, alcohols, ketones, ethers, and alkyl esters. For ease of removal from the polymer gel during evaporation, the solvents preferably have a boiling point below 120° C. under standard pressure. Examples of suitable organic solvents are linear or branched hydrocarbons having 1 to 6 carbon atoms, particularly pentane, hexane, and heptane. Particularly preferred solvents are tetrahydrofuran, acetone, methyl ethyl ketone, ethyl acetate, and chloroform.

The concentration of the polycondensation reactive resin in the solution in stage a) is usually from 5% to 25% and preferably from 8% to 15%, by weight.

The type and quantity of the curing catalyst depend on the polycondensation resin used. For amino resins, for example, organic or inorganic acids, eg. phosphoric acid, hydrochloric acid, p-toluenesulfonic acid, and carboxylic acids such as acetic acid or formic acid can be used.

Usually the curing in stage b) takes place at a polycondensation reactive resin to curing catalyst ratio in the range of from 1:1 to 20:1 and preferably from 4:1 to 10:1 by weight, based on solids. Also combinations with salts are helpful in controlling the reaction kinetics. The water content should be below 10% by weight, preferably below 5% by weight and more preferably below 0.01% by weight.

In addition, cross-linking components (curing agents) can be used, e.g. urea or 2,4-diamino-6-nonyl-1,3,5-triazines, in the case of melamine formaldehyde resins.

Curing usually takes place at temperatures ranging from 30° to 100° C. and preferably from 50 to 70° C. Gelation takes place in a timeframe of from about 0.5 hour to 10 hours and preferably from 1 hour to 4 hours. A microstructure is formed by the phase separation of the polymer network.

The organic solvent is then removed in stage c). This preferably takes place under subcritical conditions and more preferably under standard pressure at room temperature.

The nanoporous polymer foams obtainable after drying are characterized by high overall porosity and thus by a lower density and a smaller pore size. The average pore diameter preferably lies in the range of from 10 nm to 1000 nm and preferably from 30 nm to 300 nm.

The nanoporous polymer foams of the invention have low thermal conductivity, usually below 33 mW/mK, and are therefore particularly suitable for thermal insulation applications, such as insulating panels in the building industry and in refrigerating assemblies, vehicles, and industrial plants.

EXAMPLES

A butanol-etherified, highly alkylated melamine formaldehyde resin (Luwipal 44 supplied by BASF AG) was used as the polycondensation reactive resin in the examples.

The porosity was determined by mercury intrusion in accordance with DIN 66133). The specific surface area was determined according to BET (DIN 66131).

Example 1

A 10% by weight Luwipal 44 solution in tetrahydrofuran was mixed with a 37% by weight hydrochloric acid in a ratio of 5:1 by weight, based on solids, and caused to gelate at 60° C. for 3 hours in an oven. The organogel obtained was dried in air at room temperature. The mercury porosity findings on the resulting xerogel showed an overall porosity of 80%, with the major portion of the pores volume having a pore size of smaller than 1000 nm. The specific surface area was 170 $m^2/g$.

Example 2

A 10% by weight Luwipal 44 solution in acetone was mixed with a 37% by weight hydrochloric acid in a ratio of 5:1 by weight, based on solids. Gelation was carried out in an oven at 60° C. over a period of 3 hours. The resulting organogel was dried in air. The mercury porosity findings demonstrated an overall porosity of 86%, with a major portion of the pores having a pore size of smaller than 1000 nm. The specific surface area was 25 $m^2/g$.

Example 3

A 10% by weight Luwipal 44 solution in tetrahydrofuran was mixed with p-toluenesulfonic acid in a ratio of 5:1, based on solids, and mixed with 1 g of demineralized water per 30 ml of the mixture. Gelation was carried out in an oven at 60° C. for 3 hours. The organogel obtained was dried in air. The mercury porosity findings on the nanoporous polymer foam demonstrated an overall porosity of 75%, with a major portion of the pores having a pore size of smaller than 1000 nm. The specific surface area was 82 $m^2/g$.

The invention claimed is:

1. A process for the production of a nanoporous polymer foam, comprising:

a) providing of a solution of a polycondensation reactive amino resin in an organic solvent, b) mixing the solution with a curing catalyst for the polycondensation reactive resin and curing the reactive components to form a gel, and c) removing the organic solvent.

2. The process according to claim 1, wherein the reactive polycondensation resin is a urea formaldehyde resin or a melamine formaldehyde resin.

3. The process according to claim 1, wherein curing of the reactive polycondensation resin in b) is carried out by elimination of an alcohol.

4. The process according to claim 1, wherein the reactive polycondensation resin is a hydrophobic resin which is miscible with less than 10% by weight of water.

5. The process according to claim 1, wherein the solvent is a hydrocarbon, an alcohol, a ketone, an ether, an alkyl ester, or a mixture thereof having a boiling point under standard pressure of less than 120° C.

6. The process according to claim 1, wherein the solution in b) has a water content of less than 10% by weight.

7. The process according to claim 1, wherein the curing catalyst is an organic or inorganic acid.

8. The process according to claim 2, wherein curing of the reactive polycondensation resin in b) is carried out by elimination of an alcohol.

9. The process according to claim 2, wherein the reactive polycondensation resin used is a hydrophobic resin which is miscible with less than 10% by weight of water.

10. The process according to claim 3, wherein the reactive polycondensation resin used is a hydrophobic resin which is miscible with less than 10% by weight of water.

11. The process according to claim 2, wherein the solvent is a hydrocarbon, an alcohol, a ketone, an ether, an alkyl ester, or a mixture thereof having a boiling point under standard pressure of less than 120° C.

12. The process according to claim 3, wherein the solvent is a hydrocarbon, an alcohol, a ketone, an ether, an alkyl ester, or a mixture thereof having a boiling point under standard pressure of less than 120° C.

13. The process according to claim 4, wherein the solvent is a hydrocarbon, an alcohol, a ketone, an ether, an alkyl ester, or a mixture thereof having a boiling point under standard pressure of less than 120° C.

14. The process according to claim 2, wherein the solution in b) has a water content of less than 10% by weight.

15. The process according to claim 3, wherein the solution in b) has a water content of less than 10% by weight.

16. The process according to claim 4, wherein the solution in b) has a water content of less than 10% by weight.

17. The process according to claim 5, wherein the solution in b) has a water content of less than 10% by weight.

18. The process according to claim 2, wherein the curing catalyst is an organic or inorganic acid.

* * * * *